Dec. 31, 1963     D. W. PERKINS     3,116,468
SPHERICAL COORDINATE PROPORTIONAL CONTROL DEVICE
Filed Oct. 13, 1960
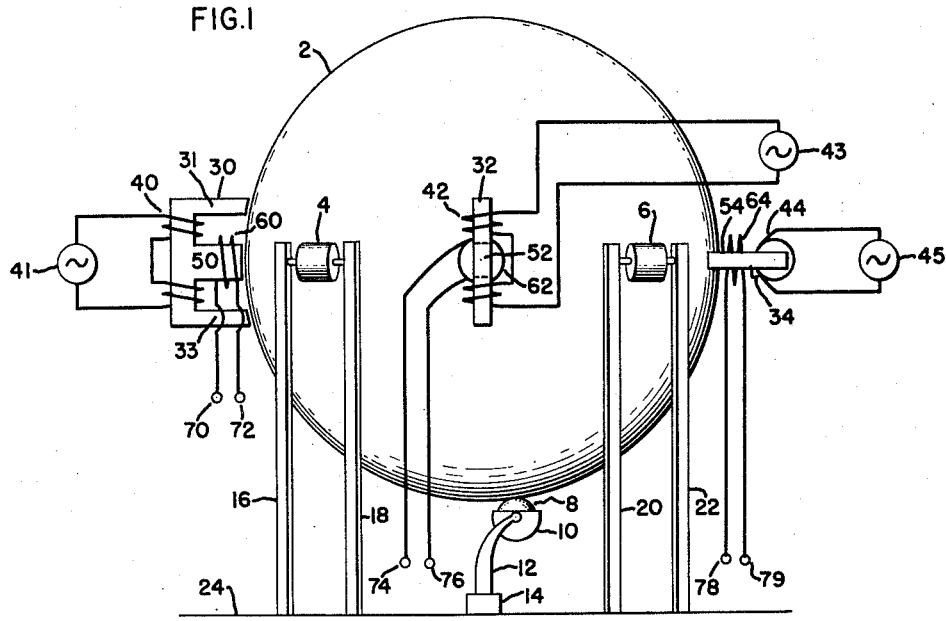
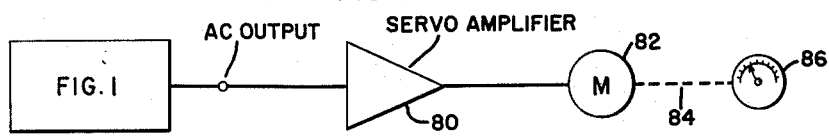
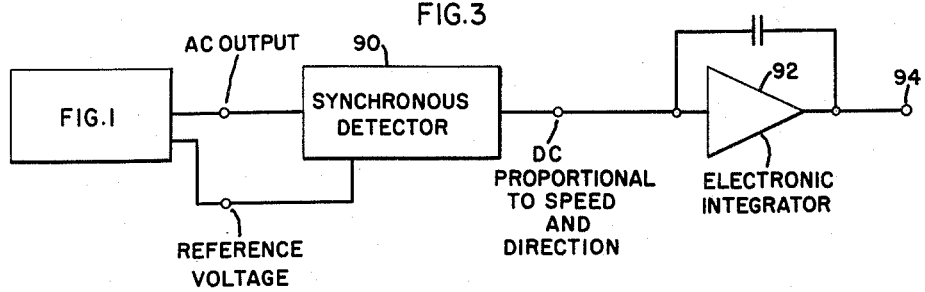
INVENTOR:
DONALD W. PERKINS,
BY *Delbert A. Warner*
HIS ATTORNEY.

United States Patent Office 3,116,468
Patented Dec. 31, 1963

3,116,468
SPHERICAL COORDINATE PROPORTIONAL
CONTROL DEVICE
Donald W. Perkins, De Witt, N.Y., assignor to General
Electric Company, a corporation of New York
Filed Oct. 13, 1960, Ser. No. 62,447
12 Claims. (Cl. 336—30)

The present invention relates to transducers for converting mechanical motion to electrical signals. More particularly, it relates to means, such as a sphere which may be rotated by hand, for receiving velocity intelligence and for converting the velocity intelligence to electrical signals.

The present invention has primary utility as a replacement for certain manual control elements. Among these manual control elements are hand wheels, "joy sticks," batteries of switches, spheres having mechanical take off and the like. In general, these prior art devices have undesirable limitations such as limitations on the amount of displacement which may be obtained about one or more axes, limitations on the degree of proportional control which is obtainable, and limitations of accuracy due to frictional losses. For example, with hand wheels, control in three dimensions is difficult, requiring as it does at least three hand wheels which must then be controlled in proper synchronization by the operator in order to provide the desired degree of control. "Joy sticks" suffer from similar limitations, since they must be moved in an essentially unnatural way in order to attain the desired effect, may be easily over-controlled and are difficult to operate in a way to give good proportional control. Switches generally provide only for stops and starts; the proportional control of speed, the precise control of direction and the like are difficult or impossible. Spheres having mechanical take offs generally have large frictional losses which limit accuracy, are limited to measurements in carefully selected directions and can provide only limited resolution. The present invention overcomes all these disadvantages by offering a wide range of proportional velocity control, unrestricted rotation about all axes and virtually unlimited resolution.

Having in mind the defects of prior art hand operated control devices, it is an object of this invention to provide such a device which provides an improved range of control signals with fewer restrictions.

Another object of this invention is to provide a hand control device providing an improved dynamic range of proportional control.

It is yet another object of this invention to provide, in a hand operated control device, means making it possible to provide signals representing unrestricted motion about any set of axes.

It is still another object of this invention to provide a multi-axis proportional control device capable of supplying control signals to provide almost unlimited resolution.

It is still another object of this invention to provide a proportional control device which, during manual operation, will provide output signals indicative of rotation about any one, two or three axes, where the axes may be at right angles to each other or related in some other fashion.

Still another object of this invention is to provide an output signal, which may be either an error signal or a velocity signal, such that the potential of the signal will be proportional to the speed, and the phase of the signal will represent the direction of motion.

It is still a further object of this invention to provide a control element for electrical positioning circuits which is superior from a human engineering viewpoint.

It is a further object of this invention to provide friction-free velocity and displacement take off for a ball control element.

It is still another object of this invention to present a ball take off which eliminates off-axis change in control torque.

The foregoing objects and others ancillary thereto, I prefer to accomplish as follows:

According to a preferred embodiment of the invention, a sphere is provided which may rest on a cradle made up of a plurality of wheels and a castor. These wheels, together with the castor which supports the weight of the sphere from below, serve to prevent displacement of the center of the sphere in any direction. With a stable platform for the sphere, a preferred embodiment of the invention then includes three E-shaped magnetic cores having poles shaped to match the contours of the sphere and placed in close proximity thereto. An excitation winding is placed on the ends or on the long sides of each of said E-shaped magnetic cores so as to have one half the length of the winding equally distributed on either side of the center pole. With this arrangement, there will be no magnetic field induced in the center pole corresponding to the center element of the E, when there is a homogeneous magnetic field in the vicinity of the poles. The sphere is made of magnetic material and has a conductive surface which, upon being rotated, produces changes in the magnetic fields which cause unbalances about the central poles and induce voltages in windings wound on said center poles. The voltages induced in the windings on the center poles are then made available as output signals to appropriate devices to be controlled.

The novel features that are characteristic of this invention are set forth with particularity in the appended claims. The invention itself, however, both as to its organization and its method of operation, together with additional objects and advantages thereof, will best be understood from the following description of a specific embodiment when read in connection with the accompanying drawings, in which:

FIG. 1 is a diagram illustrating essential features of the invention;

FIG. 2 is a schematic diagram illustrating one use for the instant invention; and FIG. 3 is a schematic diagram illustrating a further use for the instant invention.

Turning now to the embodiment of the invention illustrated in FIG. 1, a sphere is indicated at 2. The sphere may be made of magnetic material and have a conductive surface and probably would work best with such a combination; however, the device would be operable even though the sphere had only one of these properties. In the preferred embodiment of FIG. 1, the sphere rests on a cradle composed of five elements, only three of which are shown in the figure. These elements include rollers or wheels 4 and 6 which are shown and wheels 4' and 6' which would be on the other side of the sphere as drawn in FIG. 1 and which are not illustrated. These four wheels support the sphere along a horizontal great circle and prevent its moving horizontally. Under the sphere, and supporting its weight, is a ball bearing 8 which, in turn, is supported in a cup 10 on a castor arm 12 which is free to rotate in a ball bearing support 14. The wheels 4 and 6, 4' and 6' are supported on shafts on ball bearings which, in turn, are supported on supports 16, 18, 20, and 22 and supports (not shown) 16', 18', 20' and 22'. Details of construction of some of these elements have been omitted, since they are not important to the claimed invention. As indicated in FIG. 1, the sphere 2 will be firmly supported by the cradle on a base 24 and will still be free to rotate about any set of axes which pass through the center of the sphere. The ball bearing 8 and castor support elements under the sphere 2 are arranged to provide even support no matter in which direction the sphere may be rotated.

The actual sensing devices are indicated as coils wound on E-shaped magnetic cores 30, 32 and 34. Mechanical supports for these cores have been eliminated from the drawing in the interests of simplicity and clarity, but it will be recognized that the supply of such supports would be a simple matter of design and construction. The E-shaped magnetic cores 30, 32 and 34 have their pole ends shaped to match the contours of the sphere and have excitation windings 40, 42 and 44 wound, as shown in connection with core 30, along the long sides of the magnetic cores with the coils equally distributed on each side of the center poles 50, 52 and 54. These windings could equally well be wound on the outside or end pole pieces. On the center poles 50, 52 and 54 are wound output windings 60, 62 and 64.

Alternating current potentials are supplied from sources 41, 43 and 45 to coils 40, 42 and 44 which then induce magnetic fields through the upper and lower arms of the E-shaped magnetic cores, parts of which pass through the arms 50, 52 and 54 in such a way as to cancel each others effect and provide no induced potential in coils 60, 62 and 64 for so long as the sphere 2 remains stationary, or at least while the sphere has no component of translation between the arms of a particular magnetic core.

As indicated in FIG. 1, each of the magnetic cores 30, 32 and 34 is adjacent to the sphere 2. A uniform minimum air gap is maintained between each of the magnetic cores and the face of the sphere. The magnetic character of the sphere 2 provides a low reluctance magnetic path between the arms of the magnetic cores, so that a magnetic field of high flux density exists in the vicinity of each of the long arms of each core, such as 31 and 33 of core 30. This magnetic field induces currents in the conductive surface of the sphere 2, which, in turn, produces an opposing magnetic force. As previously indicated, these effects are all balanced with respect to the central portions of the magnetic core when the sphere is stationary and no signal is generated in the windings 60, 62 and 64. However, if the sphere rotates about one axis, say the axis perpendicular to the plane of FIG. 1, any currents in a magnetic field in the sphere will be "pulled" in the direction of rotation causing an unbalance in the fields around the poles—poles 31 and 33 in this example. A portion of this unbalanced flux will then pass through pole 50 inducing an A.-C. voltage in the coil 60. The magnitude of the voltage induced in coil 60 through pole 50 will vary with the speed of rotation of the sphere 2, and the phase of the voltage induced, with respect to the excitation voltage, will shift 180 degrees as the direction of rotation of the sphere is reversed. With the sphere only rotating in the plane of the figure, i.e. about an axis perpendicular to the plane of the figure, the fields in magnetic cores 32 and 34 will also be disturbed, however, they will remain balanced with respect to the central portions of the magnetic cores 52 and 54 and no output signals will be induced in coils 62 and 64.

This last-named condition prevails because the magnetic cores 30, 32 and 34 are placed in such positions that they are each parallel to a different one of three mutually perpendicular great circles on the face of a sphere. This makes it possible to obtain a maximum of three distinct outputs which are spherically related to each other, and as indicated in the last paragraph, makes it possible to vary one or two of the outputs without affecting the others, or to change all three simultaneously. The output signals generated in this way may be components of vectors representing the motion imparted to the sphere. It is possible to secure great resolution of these components, or to determine them with great accuracy, since it is possible to rotate the sphere any reasonable number of times to represent a desired quantity.

The output signals from coils 60, 62 and 64 which appear at terminals 70, 72, 74, 76, 78 and 79 may be employed in a variety of ways, some of which are indicated in FIGURES 2 and 3. For example, if the exciting potentials 41, 43 and 45 are A.-C. potentials, each of these output signals can be fed directly into a servo-amplifier, such as that indicated at 80 in FIG. 2, to drive an A.-C. motor such as 82. The speed of the motor will then be approximately proportional to the peripheral speed of the sphere and the rotation of a device connected to the motor through a shaft 84 would be a function of the rotation of the sphere on a corresponding axis. The shaft 84 could, of course, control a meter 86, position a potentiometer which could then provide a D.-C. output to control additional motors or indicating devices, or mechanically position a device which an operator wishes to control.

Another way in which the instant invention may be used is illustrated in FIG. 3 in which the error or velocity signal from one of the coils 60, 62 or 64 of FIG. 1 is supplied to a synchronous detector such as 90, so that the output voltage and polarity of the detector may be proportional to the speed and direction of rotation of the sphere. This output signal can then be fed into an electronic integrator as at 92, the output potential (at 94) of which will be proportional to the displacement of the sphere. This last output voltage may then be used to position apparatus which it is desired to control, to operate indicating means showing the amount of displacement, or for any other purpose for which such a potential may be employed.

As previously indicated, the present invention will be used primarily as a manual control device. In particular, it is envisioned that the sphere labelled 2 in FIG. 1 may be placed on a control panel or console in such a way that an operator may manually turn the sphere in any direction to provide output signals which are capable of varying the readings of selected meters, of varying the position of a spot on the face of a cathode ray tube, or of controlling various mechanical positioning devices. A visible spot on a cathode ray tube, for example, may be moved to the right or left or up or down through suitable controls coupled to the outputs of two of the magnetic circuits associated with the sphere. With this type of control it is possible for the operator to immediately make any desired adjustment in a visual display in response to changing conditions, e.g. the approach of aircraft on a radar screen. The range of control which may be obtained in this way is very great, since a trained operator may quickly make the desired changes by rapid motion of the sphere while at the same time securing almost unlimited resolution.

While the principles of the invention have now been made clear, there will be immediately obvious to those skilled in the art many modifications in structure, arrangement, proportions, the elements and components used in the practice of the invention, and otherwise, which are particularly adapted for specific environments and operating requirements without departing from those principles. The appended claims are therefore intended to cover and embrace any such modifications within the limits of the true spirit and scope of the invention.

What I claim and desire to secure by Letters Patent of the United States is:

1. A motion sensing device comprising means for providing a symmetrical magnetic field, a rotatable sphere composed of material for cooperating with said magnetic field and positioned to form a part of the magnetic circuit of said magnetic field, means for supporting said sphere to permit 360° rotation about any and all axes through the center of said sphere, means for detecting said magnetic field including a coil placed in a position which is magnetically neutral when said rotatable sphere is at rest, said means for detecting serving to detect non-symmetrical distortion of said magnetic field due to linear motion of the surface of said rotatable sphere during a rotational period and to generate a signal in proportion to a component of said linear motion.

2. A motion sensing device comprising means for providing a symmetrical magnetic field, a rotatable sphere composed of material for cooperating with said magnetic field and positioned to form a part of the magnetic circuit of said magnetic field, means for supporting said sphere to permit complete freedom of rotation about all axes through the center of said sphere, means for detecting said magnetic field including a coil placed in a position which is magnetically neutral when said rotatable sphere is at rest, said means for detecting serving to detect non-symmetrical distortion of said magnetic field due to motion of said rotatable sphere about a selected axis upon the application of velocity to said rotatable sphere and to generate a signal in proportion to the component of said velocity about said selected axis.

3. A velocity sensitive device comprising means for providing a plurality of symmetrical magnetic fields, a rotatable sphere composed of material for cooperating with said magnetic fields and positioned to form a part of the magnetic circuits of said magnetic fields, means for supporting said sphere to permit 360° rotation about any and all axes through the center of said sphere, means for detecting each of said magnetic fields including coils placed in positions which are magnetically neutral when said rotatable sphere is at rest, said coils serving to detect non-symmetrical distortion of said magnetic fields upon the attainment of rotational velocity by said rotatable sphere and to generate signals representative of components of said velocity.

4. A velocity sensitive device comprising means for providing a symmetrical magnetic field, a sphere composed of material for cooperating with said magnetic field and positioned to form a part of the magnetic circuit of said magnetic field, means for supporting said sphere to permit complete freedom of rotation about all axes through the center of said sphere, means for detecting said magnetic field including a coil placed in a position which is magnetically neutral when said sphere is at rest, said means for detecting serving to detect non-symmetrical distortion of said magnetic field when said sphere rotates about its center to impart linear velocity to its surface and to generate a signal proportional in magnitude to a selected component of said linear velocity and having a phase relationship to indicate the direction of said component of linear velocity.

5. A velocity sensitive device comprising means including a first coil wound on the arms of an E-shaped core for providing a symmetrical magnetic field, a rotatable sphere composed of material for cooperating with said magnetic field and positioned to form a part of the magnetic circuit of said magnetic field, means for supporting said sphere to permit 360° rotation about any and all axes through the center of said sphere, means for detecting said magnetic field including a second coil placed in a position on said E-shaped core which is magnetically neutral when said rotatable sphere is at rest, said means for detecting serving to detect non-symmetrical distortion of said magnetic field in the surface of said rotatable sphere upon the attainment of angular velocity by said rotatable sphere and to generate a signal in proportion to a component of said velocity.

6. A velocity sensitive device comprising means including a first coil wound on the arms of an E-shaped core for providing a symmetrical magnetic field, a rotatable sphere composed of material for cooperating with said magnetic field and positioned to form a part of the magnetic circuit of said magnetic field, means for supporting said sphere to permit complete freedom of rotation about all axes through the center of said sphere, means for detecting said magnetic field including a second coil placed in a position on said E-shaped core which is magnetically neutral when said rotatable sphere is at rest, said second coil serving to detect non-symmetrical distortion of said magnetic field upon the impartment of velocity to said rotatable sphere and to generate a signal in proportion to a selected component of said velocity.

7. A velocity sensitive device comprising means including a first plurality of coils wound on the arms of E-shaped cores for providing symmetrical magnetic fields, a rotatable sphere composed of material for cooperating with said magnetic fields and positioned to form a part of the magnetic circuits of said magnetic fields, means for supporting said sphere to permit 360° rotation about any and all axes through the center of said sphere, means for detecting said magnetic fields including a second plurality of coils placed in positions on said E-shaped cores which are magnetically neutral when said moveable object is at rest, said second plurality of coils serving to detect non-symmetrical distortion of said magnetic fields upon the attainment of velocity by said rotatable sphere and to generate signals in proportion to said velocity.

8. A velocity sensitive device comprising a first coil wound on the arms of an E-shaped core for providing a symmetrical magnetic field, a rotatable sphere composed of material for cooperating with said magnetic field and positioned to form a part of the magnetic circuit of said magnetic field, means for supporting said sphere to permit 360° rotation about any and all axes through the center of said sphere, means for detecting said magnetic field including a second coil placed in a position on said E-shaped core which is magnetically neutral when said rotatable sphere is at rest, said means for detecting serving to detect non-symmetrical distortion of said magnetic field due to the attainment of velocity by said rotatable sphere and serving to generate a signal proportional in magnitude to said velocity, said signal undergoing a phase shift in case of a reversal in direction of said velocity.

9. A motion sensitive device comprising means including first, second and third coils wound on the arms of first, second and third E-shaped cores for providing symmetrical magnetic fields, a rotatable sphere composed of material for cooperating with said magnetic fields and positioned to form a part of the magnetic circuits of said magnetic fields; means for supporting said sphere to permit 360° rotation about any and all axes through the center of said sphere, means for detecting said magnetic fields including fourth, fifth and sixth coils wound on said first, second and third E-shaped coils in a fashion to be magnetically neutral when said rotatable sphere is at rest; said fourth, fifth and sixth coils serving to detect non-symmetrical distortion of said magnetic fields due to the rotation of said sphere about any axes through its center and serving to generate signals proportional to components of a vector representing said motion.

10. In a spherical coordinate proportional control device, velocity sensing means comprising means for providing a symmetrical magnetic field, a sphere composed of material for cooperating with said magnetic field and positioned to form a part of the magnetic circuit of said magnetic field, means for detecting said magnetic field including a coil placed in a position which is magnetically neutral when said sphere is at rest, supporting means holding said sphere to permit 360° revolution of said sphere about its center in any direction, said supporting means enabling a human operator to apply angular velocity about any axes through the center of said sphere, said coil detecting non-symmetrical distortion of said magnetic field upon the application of angular velocity to said movable sphere and said coil providing a signal in proportion to said velocity, whereby said signal may be used for proportional control of controllable means.

11. A motion sensing device comprising means including first and second coils wound on the arms of first and second E-shaped magnetic cores, said first and second coils providing symmetrical magnetic fields, a rotatable sphere composed of material for cooperating with said magnetic fields and positioned to form a part of the magnetic circuits of said magnetic fields, means for supporting said sphere to permit 360° rotation about any and all axes through the center of said sphere, means for detecting magnetic fields including third and fourth coils wound on said first and second E-shaped cores, said third and fourth coils being wound in a position to be magnetically neutral when said rotatable sphere is at rest, said third and fourth coils detecting non-symmetrical distortions of said magnetic fields due to motion of said rotatable sphere, said third and fourth coils generating first and second signals, said first and second signals being proportional in magnitude to the magnitude of the components of a vector representing the magnitude of motion of said object, and said first and second signals having phase relationships with respect to a reference voltage representing the directions of the components of said vector.

12. A motion sensing device comprising means including first, second and third coils wound on the arms of first, second and third E-shaped magnetic cores; said first, second and third coils providing symmetrical magnetic fields, a rotatable sphere composed of material for cooperating with said magnetic fields and positioned to form a part of the magnetic circuits of said magnetic fields; means for supporting said sphere to permit complete freedom of rotation about all axes through the center of said sphere, means for detecting magnetic fields including fourth, fifth and sixth coils wound on said first, second and third E-shaped cores; said fourth, fifth and sixth coils being magnetically neutral when said rotatable sphere is at rest; said fourth, fifth and sixth coils detecting non-symmetrical distortions of said magnetic fields in the surface of said rotatable sphere due to motion of said rotatable sphere about its center; said fourth, fifth and sixth coils generating first, second and third signals proportional in magnitude to the magnitude of the components of a vector representing the magnitude of motion of said rotatable sphere, and said first, second and third signals having phase relationships relative to a reference voltage representing the directions of the components of said vector.

References Cited in the file of this patent
UNITED STATES PATENTS

| | | |
|---|---|---|
| 2,552,722 | King | May 15, 1951 |
| 2,683,989 | Clark | July 20, 1954 |
| 2,692,357 | Nelson | Oct. 19, 1954 |
| 2,806,295 | Ball | Sept. 17, 1957 |
| 2,878,445 | Scarborough | Mar. 17, 1959 |
| 2,989,711 | Smith | June 20, 1961 |
| 3,002,384 | MacDonald et al. | Oct. 3, 1961 |